United States Patent
Kim et al.

(10) Patent No.: US 10,556,982 B2
(45) Date of Patent: Feb. 11, 2020

(54) THERMOPLASTIC POLYURETHANE RESIN COMPOSITION HAVING ENHANCED TEXTURE AND DURABILITY AND PRODUCTION METHOD THEREOF

(71) Applicants: Hyundai Motor Company, Seoul (KR); Dongsung Corporation, Busan (KR)

(72) Inventors: Hak Soo Kim, Gyeonggi-do (KR); Sang Yun Lee, Ulsan (KR); Jae Chan Lee, Busan (KR); Dae Young Kwon, Ulsan (KR)

(73) Assignee: Hyundai Motor Company, Seoul (KR)

( * ) Notice: Subject to any disclaimer, the term of this patent is extended or adjusted under 35 U.S.C. 154(b) by 184 days.

(21) Appl. No.: 15/341,407

(22) Filed: Nov. 2, 2016

(65) Prior Publication Data

US 2017/0275411 A1 Sep. 28, 2017

(30) Foreign Application Priority Data

Mar. 22, 2016 (KR) .................. 10-2016-0034089

(51) Int. Cl.
| | | |
|---|---|---|
| *C08G 18/46* | (2006.01) | |
| *C08G 18/66* | (2006.01) | |
| *C08G 18/42* | (2006.01) | |
| *C08L 75/06* | (2006.01) | |
| *C08G 18/32* | (2006.01) | |
| *C08G 18/76* | (2006.01) | |

(52) U.S. Cl.
CPC ..... *C08G 18/4692* (2013.01); *C08G 18/3206* (2013.01); *C08G 18/4238* (2013.01); *C08G 18/4252* (2013.01); *C08G 18/664* (2013.01); *C08G 18/7671* (2013.01); *C08L 75/06* (2013.01)

(58) Field of Classification Search
CPC ............ C08G 18/4238; C08G 18/3206; C08G 18/7671; C08G 18/4252; C08G 18/4692; C08G 18/664; C08L 75/06
See application file for complete search history.

(56) References Cited

U.S. PATENT DOCUMENTS

| | | | |
|---|---|---|---|
| 5,283,112 A * | 2/1994 | Krishnan | B32B 5/26 442/263 |
| 5,430,121 A * | 7/1995 | Pudleiner | C08G 18/12 525/439 |
| 2004/0116646 A1 * | 6/2004 | Choi | C08G 18/0895 528/66 |
| 2006/0047083 A1 * | 3/2006 | Yilgor | C08G 18/10 525/314 |
| 2006/0047089 A1 | 3/2006 | Cho et al. | |
| 2007/0112165 A1 * | 5/2007 | Chen | C08G 18/6607 528/44 |
| 2011/0086940 A1 * | 4/2011 | Rega | A61L 27/18 523/122 |
| 2012/0277394 A1 * | 11/2012 | Taniguchi | C08G 18/61 528/28 |
| 2014/0246621 A1 | 9/2014 | Taniguchi et al. | |
| 2017/0029554 A1 * | 2/2017 | Ahn | C08G 18/3206 |

FOREIGN PATENT DOCUMENTS

| | | |
|---|---|---|
| EP | 0891999 A1 | 1/1999 |
| JP | H041252 A | 1/1992 |
| JP | 2008143960 A | 6/2008 |
| JP | 2011080016 A | 4/2011 |
| JP | 2011105809 A | 6/2011 |
| KR | 20050017479 A | 2/2005 |
| KR | 20120101369 A | 9/2012 |

* cited by examiner

*Primary Examiner* — Rabon A Sergent
(74) *Attorney, Agent, or Firm* — Brinks Gilson & Lione

(57) ABSTRACT

A thermoplastic polyurethane resin composition having enhanced texture and durability is capable of ensuring excellent appearance quality by applying polyester polyol including, polytetramethylene ether glycol and polydimethylsiloxane diol to an existing thermoplastic polyurethane resin composition, having excellent mechanical properties and long-term durability, such as anti-scratch and abrasion resistance, while largely enhancing texture quality, largely reducing producing costs by replacing a material such as natural leather, reducing generation of a volatile organic compound (VOC), and using the VOC in a surface material for a vehicle interior material.

12 Claims, No Drawings

THERMOPLASTIC POLYURETHANE RESIN COMPOSITION HAVING ENHANCED TEXTURE AND DURABILITY AND PRODUCTION METHOD THEREOF

CROSS-REFERENCE TO RELATED APPLICATION

This application claims priority to and the benefit of Korean Patent Application No. 10-2016-0034089 filed on Mar. 22, 2016, the entire content of which is incorporated herein by reference.

FIELD

The present disclosure relates to a thermoplastic polyurethane resin composition having enhanced texture and durability and a method of producing thereof.

BACKGROUND

A plastic interior material has been mainly used as a surface material of a knob present in an apparatus for controlling transmission gear stages of vehicles. However, this surface material becomes hard and sticky, and thus, improvement of grip feeling has been required.

Polyvinyl chloride (PVC) injection and leather covering injection are applied to the current transmission gear shift (TGS) for improving the grip feeling. However, the PVC material is soft and sticky during injection, and there is a limit to the application of the PVC material due to the generation of substances called endocrine disruptors (environmental hormones). In the case of the natural leather covering, it is disadvantageous because the increase in production cost is excessive due to material costs and the need to incorporate an additional process step.

Replacement of these PVC or natural leather surface materials with thermoplastic polyurethane materials is difficult because one cannot ensure the appearance quality during molding. Moldability is disadvantageous due to the soft feature of the material. In addition, there is a problem in that abrasion resistance and anti-scratch of the surface of the molded material is poor.

There is a method of covering a component after molding the surface by using a powder slush molding (PSM) method, but because the production cost is high and it is vulnerable to scratch, its use is limited to only some components of luxury vehicles.

Therefore, it is desirable to develop new moldable materials that exhibit enhanced properties with respect to grip feeling (texture quality) and durability for use in vehicle interiors.

The above information disclosed in this Background section is only for enhancement of understanding of the background of the present disclosure and therefore it may contain information that does not form part of the prior art that is already known in this field to a person of ordinary skill.

SUMMARY

The present disclosure generally relates to a thermoplastic polyurethane resin composition having enhanced texture and durability, a method of producing thereof, and for molding the thermoplastic polyurethane resin composition to form a molded article. The method is capable of ensuring appearance quality by applying polyester polyol including, without limitation, polytetramethylene ether glycol and polydimethylsiloxane diol, to an existing thermoplastic polyurethane resin composition. The resulting thermoplastic polyurethane resin composition exhibits desirable mechanical properties and long-term durability, such as anti-scratch and abrasion resistance, while enhancing texture quality, reducing producing costs by replacing expensive conventional materials (e.g., natural leather), and reducing the generation of a volatile organic compound (VOC)

In one aspect, the present disclosure provides a thermoplastic polyurethane resin composition with enhanced texture and durability comprising: about 15 to 60 parts by weight of an isocyanate compound; about 40 to 80 parts by weight of polyester polyol including polytetramethylene ether glycol and polydimethylsiloxane diol; and about 5 to 40 parts by weight of a chain extender.

In another aspect, the present disclosure provides a method of producing a thermoplastic polyurethane resin composition having enhanced texture and durability, in which the thermoplastic polyurethane resin composition includes an isocyanate compound, a polyester polyol, and a chain extender. The method comprises: (a) mixing a multifunctional carboxyl acid compound, a multifunctional alcohol compound, polytetramethylene ether glycol, and polydimethylsiloxane diol; (b) heating from room temperature to about 140 to 160° C. and then maintaining the temperature for about 60 to 120 minutes after step (a); (c) secondarily heating from the initial heating temperature up to about 210 to 230° C. and then maintaining the temperature for about 10 to 120 minutes; and (d) producing the polyester polyol by decompressing in vacuum at the secondary heating temperature.

In yet another aspect, the present disclosure provides a molded article produced by molding the thermoplastic polyurethane resin composition.

In the thermoplastic polyurethane resin composition according to the present disclosure, it is possible to ensure appearance quality even by the existing injecting method and have a desirable mechanical property and long-term durability, such as anti-scratch and abrasion resistance, while substantially enhancing the texture quality by applying the polyester polyol including without limitation, polytetramethylene ester glycol and polydimethylsiloxane diol.

It is also possible to reduce the production cost by replacing the dual specification of covering the existing PVC material and the natural leather, and reducing the generation of a volatile organic compound (VOC). The thermoplastic polyurethane resin composition of the present disclosure can be advantageously used as the surface material for the interior of a vehicle.

Further areas of applicability will become apparent from the disclosure provided herein. It should be understood that the description and specific examples are intended for purposes of illustration only and are not intended to limit the scope of the present disclosure.

DETAILED DESCRIPTION

Hereinafter reference is made in detail to various examples of the present disclosure, as described below. While the present disclosure is described in conjunction with these specific examples, it will be understood that the present description is not intended to limit the disclosure to those examples. On the contrary, the present disclosure is intended to cover not only these examples, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present disclosure provides a thermoplastic polyurethane resin composition with enhanced texture and durability including about 15 to 60 parts by weight of an isocyanate compound; about 40 to 80 parts by weight of polyester polyol including, without limitation, polytetramethylene ether glycol and polydimethylsiloxane diol; and about 5 to 40 parts by weight of a chain extender.

According to one aspect of the present disclosure, the polyester polyol may compensate for weakness of hydrolysis resistance having existing ester-based polyol by using, polytetramethylene ether glycol (PTMG), without limitation, and improve mechanical strength, abrasion resistance, weather resistance, and chemical resistance as advantages of ester.

Texture quality for a knob surface material of a transmission gear used in the interior of the vehicle and abrasion resistance may be improved by using reactive polydimethylsiloxane diol. Further, the polydimethylsiloxane diol is classified as an eco-friendly material as compared with a conventional PVC material, and use of a plasticizer is not required and generation of the VOC may be largely reduced. The polydimethylsiloxane diol is added in a process of synthesizing polyester polyol, not in a process of a thermoplastic polyurethane (TPU) resin so that a chemical bonding is performed through reaction with acid. Accordingly, the polydimethylsiloxane diol becomes a part of soft segment chain serving as a matrix in a thermoplastic polyurethane (TPU) structure. Therefore, the thermoplastic polyurethane (TPU) structure may improve texture quality of a final mold and enhance abrasion resistance.

The polyester polyol may include about 40 to 80 parts by weight of a multifunctional carboxylic acid compound; about 20 and 50 parts by weight of a multifunctional alcohol compound; about 10 to 40 parts by weight of polytetramethylene ether glycol; and about 0.5 to 20 parts by weight of polydimethylsiloxane diol. Alternatively, 10 to 40 parts by weight of the polytetramethylene ester glycol may be used with respect to the entire composition content. When the content thereof is less than 10 parts by weight, hydrolysis resistance of the thermoplastic polyurethane may be degraded, and when the content thereof is more than 40 parts by weight, heat resistance of the thermoplastic polyurethane may be degraded.

In addition, 0.5 to 20 parts by weight of the polydimethylsiloxane diol may be used with respect to the entire composition content. When the content thereof is less than 0.5 part by weight, the texture quality of the final mold may be degraded, and when the content is more than 20 parts by weight, price competitiveness of TPU may be degraded according to an excessive increase in raw material prices.

According to another aspect of the present disclosure, the multifunctional carboxylic acid compound may be one or more kinds selected from a group including, but not limited to, adipic acid, sbelic acid, abelic acid, azelic acid, sebacic acid, dodecandioic acid, and trimeric acid.

According to another aspect of the present disclosure, the multifunctional alcohol compound may be one or more diols selected from a group including, without limitation, ethylene glycol, butane diol, and hexane diol, triols of trimethylol propane, or a mixture thereof.

According to another aspect of the present disclosure, the polytetramethylene ether glycol may have a hydroxyl value of 56.1 to 561 mg KOH/g. Particularly, when the hydroxyl value of the polytetramethylene ether glycol is less than 56.1 mg KOH/g, the reaction may be finished while the polytetramethylene ether glycol is mixed without chemical bonding when synthesizing the polyester polyol because the molecular weight is excessively high. When the hydroxyl value of the polytetramethylene ether glycol is more than 561 mg KOH/g, the weight content of the ether component in the thermoplastic polyurethane is decreased, or any improved effect of hydrolysis resistance of the thermoplastic polyurethane may be decreased due to an increase in the number of ester bonds.

According to another aspect of the present disclosure, the polydimethylsiloxane diol may have a hydroxyl value of 100 to 150 mg KOH/g. When the hydroxyl value of the polydimethylsiloxane diol is less than 100 mg KOH/g, reaction may be finished while the polydimethylsiloxane diol is simply mixed without any ester bonding when synthesizing the polyester polyol because the molecular weight is excessively high. When the hydroxyl value of the polydimethylsiloxane diol is more than 150 mg KOH/g, an improved effect of hydrolysis resistance of the thermoplastic polyurethane may be decreased due to an increase in the number of ester bonds. Alternatively, the hydroxyl value may be 100 to 120 mg KOH/g.

According to another aspect of the present disclosure, the polyester polyol may have a hydroxyl value of 11.22 to 224.11 mg KOH/g. Particularly, when the hydroxyl value of the polyester polyol is less than 11.22 mg KOH/g, the soft segment is constituted by chains having an excessive high molecular weight to cause blooming (a surface whitening phenomenon) of the thermoplastic polyurethane as a final product. When the hydroxyl value of the polyester polyol is more than 224.11 mg KOH/g, the soft segment is constituted by chains having a low molecular weight, and thus, stickiness is increased in an injection process of the thermoplastic polyurethane as the final product and demolding workability may be degraded.

According to yet another aspect of the present disclosure, the isocyanate compound may be used equally or similarly to a compound used when producing general polyurethane, and preferably, may be aromatic isocyanate, aliphatic isocyanate, or alicyclic isocyanate as an example. More particularly, the isocyanate compound may be one or more kinds selected from a group including, but not limited to, diphenyl methane diisocyanate (MDI), tolunene diisocyanate (TDI), dicyclohexylmethane diisocyanate ($H_{12}MDI$), and isophorone diisocyanate (IPDI).

According to another aspect of the present disclosure, the chain extender may be one or more kinds selected from a group comprising, consisting of, or consisting essentially of one or more diols selected from a group including, without limitation, ethylene glycol, diethylene glycol, butane diol, and hexane diol; triols of trimethylol propane; and polytetramethylene ether glycol.

According to another aspect of the present disclosure, the thermoplastic polyurethane resin composition may have a melting index (MI), as measured according to ISO-1133 using weight of 2.16 kg, 200° C., of 10 to 60 g/10 min. Particularly, when the MI of the thermoplastic polyurethane resin composition is less than 10 g/10 min, a flow property of the melt is decreased and thus, the injection molding may be difficult due to the decreased filling characteristic. When the MI of the thermoplastic polyurethane resin composition is more than 60 g/10 min, the mechanical property of the thermoplastic polyurethane resin may be decreased.

Meanwhile, in the production method of the thermoplastic polyurethane resin composition including the isocyanate compound, the polyester polyol, and the chain extender, the present invention provides a production method of the thermoplastic polyurethane resin composition having enhanced texture and durability. The method includes: (a) mixing a multifunctional carboxyl acid compound, a multifunctional alcohol compound, polytetramethylene ether glycol, and polydimethylsiloxane diol; (b) heating from room temperature to about 140 to 160° C. and then maintaining the temperature for about 60 to 120 minutes after step (a); (c) secondarily heating from the initial heating temperature to about 210 to 230° C. and then maintaining the temperature for about 10 to 120 minutes; and (d) producing the polyester polyol by decompressing in vacuum at the secondary heating temperature.

According to one aspect of the present disclosure, in step (a), the thermoplastic polyurethane resin composition may be produced by mixing about 40 to 80 parts by weight of the multifunctional carboxyl acid compound, about 20 to 50 parts by weight of the multifunctional alcohol compound, about 10 to 40 parts by weight of the polytetramethylene ether glycol, and about 0.5 to 20 parts by weight of the polydimethylsiloxane diol. Further, in step (a), the glycols may be mixed by adding tin octoate as a reactive catalyst so as to rapidly react with the acid.

According to another aspect of the present disclosure, in step (b), it is good that the temperature is maintained for about 60 to 120 minutes at the primary heating temperature of about 140 to 160° C. When the temperature is less than 140° C., the temperature is lower than a melting temperature of acid and thus, the ester reaction may not be performed. When the temperature is more than 160° C., the temperature is higher than the melting temperature of the acid and thus, the ester reaction may not be performed. Alternatively, the temperature is maintained for about 60 minutes at the initial heating temperature of about 150° C.

According to another aspect of the present disclosure, in step (c), the temperature is maintained for about 10 to 120 minutes at the secondary heating temperature of about 210 to 230° C. When the temperature is less than 210° C., the reaction is delayed and thus, a processing time may be increased. When the temperature is more than 230° C., the polyester polyol may be discolored. Alternatively, the temperature is maintained for about 30 minutes at the secondary heating temperature of about 230° C. Particularly, when the heating and maintaining are performed in the two primary (initial) and secondary steps, the ester reaction may be activated by inducing rapid dehydration of the mixture mixed in step (a).

According to another aspect of the present disclosure, the step (d) is slowly performed at the hydroxyl value of about 5 mg KOH/g or less when forming the polyester polyol to produce the polyester polyol by facilitating the reaction through vacuum decompression at about 650 to 760 mm Hg. Alternatively, the reaction is finished when the hydroxyl value is 0.5 mg KOH/g or less in the vacuum decompression process.

According to yet another aspect of the present disclosure, the production method of the thermoplastic polyurethane includes I) adding about 0.05 to 3 parts by weight of an antioxidant, about 0.1 to 1 part by weight of a UV stabilizer, and about 0.1 to 3 parts by weight of a hydrolysis resistance agent to the polyester polyol produced through the steps (a) to (d) and mixing while keeping the temperature at about 60 to 100° C.; II) preparing a chain extender and isocyanate, respectively; III) mixing and polymerizing about 40 to 80 parts by weight of the polyester polyol produced in step I), about 5 to 40 parts by weight of the chain extender, and about 15 to 60 parts by weight of the isocyanate; IV) continuously extruding and pelletizing in a temperature range of about 100 to 300° C. by a reaction extruder; V) continuously aging for about 1 to 3 hours at about 80 to 120° C.; VI) packaging a produced material discharged in the aging; and VII) a discoloring step by mixing and extruding the produced material obtained through the steps I) to VI) with about 0.1 to 2 parts by weight of pigment in a temperature range of about 150 to 300° C.

According to another aspect of the present disclosure, in step II), the reaction raw material may be prepared, in which the chain extender is fed to a glycol day tank and maintained at a temperature of about 60 to 100° C., and the isocyanate is fed to an isocyanate day tank and maintained at a temperature of about 40 to 80° C.

According to another aspect of the present disclosure, in step III), the respective components are measured by a precise metering system to be fed to the reaction extruder, and then a polyaddition reaction may be performed.

Meanwhile, the present disclosure may provide a molded article by molding the thermoplastic polyurethane resin composition. The molded article may be a surface material for a vehicle interior material. For example, the molded article may be, without limitation, a knob surface material of a vehicle transmission gear.

The thermoplastic polyurethane resin composition according to the present disclosure can provide desirable appearance quality even when using an existing injecting method and have a mechanical property and long-term durability, such as anti-scratch and abrasion resistance, while largely improving the texture quality by applying the polyester polyol including, polytetramethylene ether glycol and polydimethylsiloxane diol.

There are advantages of largely reducing the production costs by replacing dual specification of covering the existing PVC material and the natural leather, reducing the generation of a VOC, and using the thermoplastic polyurethane resin composition in the surface material for the vehicle interior material.

The following specific examples illustrate the invention and are not intended to limit the same.

TEST EXAMPLE 1

A total of 55 kg of adipic acid, 28.8 kg of 1,4-butanediol, 27.1 kg of polytetramethylene ether glycol having a hydroxyl value of 448.8 mg KOH/g, 4.2 kg of a polydimethylsiloxane diol compound, and 10 g of tin octoate were added and mixed. Next, the mixture was primarily or initially heated from room temperature to 150° C. and then maintained at 150° C. for 60 minutes. Next, the mixture was secondarily heated from 150° C. to 230° C. and then maintained at 230° C. which is the secondary heating temperature for 30 minutes. After the mixture was decompressed in vacuum of 720 mmHg at the secondary heating temperature, when the hydroxyl value was 0.5 mg KOH/g or less, the reaction was finished to produce polyester polyol having the condensation number of 13.5% and the hydroxyl value of 44.8 mg KOH/g.

A total of 293.0 kg/hr of the produced polyester polyol, 34.9 kg/hr of 1,4-butanediol, and 125 kg/hr of diphenyl methane diisocyanate were continuously fed with fixed quantity and reacted in a twin co-rotation extruder with a diameter of 92 mm.

In this case, the polyester polyol, the 1,4-butanediol, and the diphenyl methane diisocyanate were maintained at 78 to 82° C., 58 to 62° C., and 43 to 47° C., respectively. In addition, while the extruder temperature was set and maintained at temperatures of 200 to 230° C. of a polymerization unit and 150 to 230° C. of a downstream part, the extruder was operated. Continuously, a product prepared in a pellet form was transferred to an aging machine to be aged for 2 hours at a temperature of 118 to 122° C. An antioxidant, a hydrolysis resistance agent, and a UV stabilizer were separately added when a thermoplastic polyurethane resin was produced.

The produced thermoplastic polyurethane resin composition had a melt flow index of 25 g/10 min under a condition of 200° C. and 2.16 kg according to ISO1133. Next, 1 part by weight of black-based pigment was mixed with the thermoplastic polyurethane resin composition and the mixture was extruded at a temperature of 180 to 230° C. to produce a TPU pellet having a thermal characteristic suitable for an injection method.

Next, a surface material was insert-injected by a known injection molding method using the obtained thermoplastic polyurethane in the pellet form to complete a molded article and then a part thereof was taken as a sample. Simultaneously, in order to evaluate basic properties and features, a specimen having surface gloss of 1.0±0.2 (low gloss) that was measured by 60° glossmeter (BYK Inc.) and a thickness of 1 mm and a horizontal×vertical size of 120 mm×150 mm was produced.

COMPARATIVE EXAMPLE 1

Instead of the polyester polyol produced in the polymerization process of the Example 1, 235.2 kg/hr of polybutylene adipate having a hydroxyl value of 112.2 mg KOH/g, 28.4 kg/hr of 1,4-butanediol, and 136 kg/hr of diphenylmethane diisocyanate were fed. Then Comparative Example 1 was performed under the same condition as the Example 1 to obtain a thermoplastic polyurethane resin composition. A plate specimen was produced by using the thermoplastic polyurethane resin composition. The produced thermoplastic polyurethane resin composition had a melt flow index of 35 g/10 min.

COMPARATIVE EXAMPLE 2

Instead of the polyester polyol produced in the polymerization process of the Example 1, 250.8 kg/hr of polybutylene adipate having a hydroxyl value of 56.1 mgKOH/g, 31.2 kg/hr of 1,4-butanediol, and 118.8 kg/hr of diphenylmethane diisocyanate were fed. Then Comparative Example 2 was performed under the same condition as the Example 1 to obtain a thermoplastic polyurethane resin composition. A plate specimen was produced by using the thermoplastic polyurethane resin composition. The produced thermoplastic polyurethane resin composition had a melt flow index of 22 g/10 min.

COMPARATIVE EXAMPLE 3

Instead of the polyester polyol produced in the polymerization process of the Example 1, 235.2 kg/hr of polytetramethylene ether glycol (PTMEG) having a hydroxyl value of 112.2 mg KOH/g, 28.4 kg/hr of 1,4-butanediol, and 136 kg/hr of diphenylmethane diisocyanate were fed. Then Comparative Example 3 was performed under the same condition as the Example 1 to obtain a thermoplastic polyurethane resin composition. A plate specimen was produced by using the thermoplastic polyurethane resin composition. The produced thermoplastic polyurethane resin composition had a melt flow index of 31 g/10 min.

COMPARATIVE EXAMPLE 4

Instead of the polyester polyol produced in the polymerization process of the Example 1, 250.8 kg/hr of polytetramethylene ether glycol (PTMEG) having a hydroxyl value of 56.1 mg KOH/g, 31.2 kg/hr of 1,4-butanediol, and 118.8 kg/hr of diphenylmethane diisocyanate were fed. Then Comparative Example 4 was performed under the same condition as the Example 1 to obtain a thermoplastic polyurethane resin composition. A plate specimen was produced by using the thermoplastic polyurethane resin composition. The produced thermoplastic polyurethane resin composition had a melt flow index of 28 g/10 min.

COMPARATIVE EXAMPLE 5

A total of 284.6 kg/hr of the polyester polyol produced in the polymerization process of the Example 1, 33.9 kg/hr of 1,4-butanediol, and 81.5 kg/hr of hexamethylene diisocyanate were fed. Then Comparative Example 5 was performed under the same condition as the Example 1 to obtain a thermoplastic polyurethane resin composition. A plate specimen was produced by using the thermoplastic polyurethane resin composition. The produced thermoplastic polyurethane resin composition had a melt flow index of 19 g/10 min.

COMPARATIVE EXAMPLE 6

In the synthesizing of the polyester polyol of the Example 1, except producing the polyester polyol without adding a polydimethylsiloxane diol, Comparative Example 6 was performed under the same condition as the Example 1 to obtain a thermoplastic polyurethane resin composition. A plate specimen was produced by using the thermoplastic polyurethane resin composition. The produced thermoplastic polyurethane resin composition had a melt flow index of 21 g/10 min.

Example—Evaluation of Appearance Quality, Workability, & Texture Quality

Appearance quality, workability, and texture quality of plate specimens produced in Example 1 and Comparative Examples 1 to 6 were evaluated with conditions and measurements shown in the following Tables 1 and 2. The following Table 1 lists injection conditions for the plate specimens. The injection conditions of Table 1 are conditions optimized and set so that the appearance is best molded.

TABLE 1

Injection Conditions

| | Unit | Test Example | Comparative Examples | | | | | |
|---|---|---|---|---|---|---|---|---|
| | | | 1 | 2 | 3 | 4 | 5 | 6 |
| Nozzle Temperature | °C. | 185 | 180 | 190 | 180 | 180 | 180 | 180 |
| Cylinder Temperature | °C. | 185 | 180 | 190 | 180 | 180 | 180 | 180 |
| Injection Time | sec | 4 | 4 | 4 | 4 | 4 | 4 | 4 |
| Dwelling Time | sec | 4 | 4 | 4 | 4 | 4 | 4 | 4 |
| Cooling Time | sec | 34 | 60 | 32 | 50 | 34 | 30 | 35 |
| Cycle Time | sec | 42 | 68 | 40 | 58 | 42 | 38 | 43 |

The following Table 2 lists grades 5 to 1 classified in a good order for each item. Specifically, filling rate, gas stains, weld lines, and sink marks were checked with the naked eye to evaluate the appearance and de-forming as an evaluation result by an operator. The texture quality is an average evaluation result of 50 evaluators. Die clamping force of an injector was 200 tons, one gate was included, a knob core resin was nylon, and an insert injection method was performed.

TABLE 2

Evaluation Result of Injection Molded Article for Appearance Quality, Workability, and Texture Quality.

| | Test Example | Comparative Example | | | | | |
|---|---|---|---|---|---|---|---|
| | | 1 | 2 | 3 | 4 | 5 | 6 |
| Filling rate (grade) | 5 | 5 | 5 | 5 | 5 | 5 | 5 |
| Gas stain (grade) | 5 | 5 | 5 | 5 | 5 | 5 | 5 |
| Weld line (grade) | 5 | 5 | 5 | 5 | 5 | 4 | 5 |
| Sink mark (grade) | 5 | 4 | 5 | 4 | 5 | 5 | 5 |
| De-forming (grade) | 5 | 3 | 4 | 3 | 4 | 4 | 4 |
| Texture quality (grade) | 4.8 | 3.7 | 3.3 | 3.7 | 4 | 3 | 4 |
| Note | — | Shrinkage deformation after cooling | — | Shrinkage deformation after cooling | — | — | — |

Order: 5 > 4 > 3 > 2 > 1 (5 is good and 1 is bad)

In Table 1, a cycle time of the Test Example was 42 seconds and similar to, slightly larger than, or not largely different from those of Comparative Examples 2, 4, 5, and 6, and relatively smaller than those of Comparative Examples 1 and 3. As a result, in the Test Example, it can be seen that a molding process cycle was not particularly long and there was no problem in productivity.

According to the result of Table 2, in the case of Comparative Examples 2 and 4 using only polybutylene adipate or polytetramethylene ether glycol having a low hydroxyl value as polyol, respectively, the de-forming was degraded, the sink mark was generated, and deformation after cooling was exhibited. Further, in the case of Comparative Example 5 using hexamethylene diisocyanate, weld lines were finely exhibited and the texture quality was relatively low.

In the case of Comparative Example 6 without including polydimethylsiloxane diol, as compared with the Test Example, deforming and texture quality were relatively slightly low.

On the other hand, in the case of the Test Example, it can be seen that the appearance quality was good in all items, deforming was excellent, and the best texture quality was exhibited. Particularly, it can be seen that polydimethylsiloxane diol was chemically connected to a soft segment to have an effect on enhancement of deforming and texture quality.

Example—Evaluation of Mechanical Properties

Mechanical properties were measured from plate specimens having a thickness of 1 mm produced in the Test Example and Comparative Examples 1 to 6, and the results are listed in the following Tables 3 and 4.

(1) Specific gravity and hardness—The specific gravity was measured by an underwater substitution method according to a method specified in ASTM D 792 (ASTM International, West Conshohocken, Pa.) and the hardness was measured by a shore A durometer according to ASTM D 2240.

(2) Tensile strength—The tensile strength was measured by using a machine of Instron Corporation according to ASTM D 412, and in this case, the weight was 5 kN, the specimen was dumbbell 3 type, and the tensile velocity was 200 m/min.

(3) Anti-scratch—The anti-scratch was observed from a surface appearance when the surface was scratched once by putting a counterweight of 300 grams on a scratch ruler manufactured using SUS 403 stainless steel. The appearance evaluation was classified to 5 grades according to scratch recognition of the surface. When the damage to the surface was significant, the grade was grade 1 and when the damage to the surface was not recognized, the grade was grade 5.

(4) Heat aging resistance and light aging resistance—In the heat aging resistance, the color difference was measured by using a known colorimeter after aging for 500 hours at 120° C. by using a thermo-hygrostat, and in the gloss change rate, a change rate (%) to initial gloss was measured by a gloss meter at 60° C.

In the light aging resistance, a gloss change rate of the sample and a color-difference change of the sample were measured by using an Atlas CI 4000 Xenon Arc Weather-O-meter (Atlas Material Testing Technology, Mount Prospect, Ill.) as a promotion anti-light tester. A test condition had a wavelength of 300 to 400 nm, light strength of 70 W/m$^2$, and a temperature of the specimen surface was 89° C. and the test was performed at total 84 MJ/m$^2$.

(5) Moisture aging resistance—In the moisture aging resistance, the appearance after being left for 7 days under a condition of 50±5° C. and relative humidity of 95±3% was compared by using the thermo-hygrostat.

(6) Abrasion resistance—The abrasion resistance was evaluated by a Taber abrasion test specified in ASTM D 4060. The abrasion wheel was H18, a weight was 1 kg, preliminary abrasion was 100 times, and a rotational speed was 60 rpm.

TABLE 3

Property Evaluation Results

| | Standard | Unit | Test Example | Comparative Examples 1 | 2 | 3 | 4 |
|---|---|---|---|---|---|---|---|
| Specific gravity | ASTM D 792 | — | 1.187 | 1.195 | 1.198 | 1.115 | 1.117 |
| Hardness | ASTM D 2240 | Shore A | 85 | 85 | 85 | 84 | 85 |
| Tensile strength | ASTM D 412 | kgf/cm$^2$ | 484 | 488 | 472 | 490 | 494 |
| Anti-scratch | — | Grade | 4 | 3 | 3 | 3 | 3 |
| Heat aging resistance | — | Gloss change rate (%) | 20 | 28 | 25 | 35 | 28 |
| Heat aging resistance | — | DE | 1.21 | 1.18 | 1.15 | 1.8 | 1.78 |
| Light aging resistance | — | Gloss change rate (%) | 20 | 22 | 27 | 38 | 41 |
| Light aging resistance | — | DE | 1.3 | 1.25 | 1.21 | 2.1 | 2.11 |
| Moisture aging resistance | — | Appearance change (naked eye) | Clear | Clear | Generation of blooming | Clear | Generation of blooming |
| Abrasion resistance | ASTM D 4060 | Mg (loss weight) | 5.2 | 14.8 | 14.9 | 16.3 | 17.1 | order: 5 > 4 > 3 > 2 > 1 (5 is good and 1 is bad)

TABLE 4

Additional Property Results

| | Standard | Unit | Comparative Example 5 | Comparative Example 6 |
|---|---|---|---|---|
| Specific gravity | ASTM D 792 | — | 1.13 | 1.184 |
| Hardness | ASTM D 2240 | Shore A | 87 | 85 |
| Tensile strength | ASTM D 412 | kgf/cm$^2$ | 490 | 478 |
| Anti-scratch | — | Grade | 3 | 3 |
| Heat aging resistance | — | Gloss change rate (%) | 33 | 18 |
| Heat aging resistance | — | Discoloration ΔE | 0.71 | 1.18 |
| Light aging resistance | — | Gloss change rate (%) | 28 | 25 |
| Light aging resistance | — | Discoloration ΔE | 0.82 | 1.41 |
| Moisture aging resistance | — | Appearance change (naked eye) | Generation of blooming | Clear |
| Abrasion resistance | ASTM D 4060 | Mg (loss weight) | 25 | 15.1 | order: 5 > 4 > 3 > 2 > 1 (5 is good and 1 is bad)

According to the results of Tables 3 and 4, in the case of Comparative Examples 2, 4, and 5, in the moisture aging resistance test, white blooming was generated and degradation of the appearance quality was caused when being left for a long time. Generally, since the vehicle interior material may cause degradation of polymers by UV and heat according to solar light irradiation, heat resistance and light aging resistance are important evaluation items.

In Comparative Example 5, discoloration after heat resistance and light aging resistance as aliphatic TPU was lowest, but as described above, it can be seen that the blooming problem was caused, and relatively, abrasion resistance and anti-scratch were poor as compared with the Test Example.

On the other hand, in the Test Example, as compared with Comparative Examples 1 to 6, it can be seen that anti-scratch and abrasion resistance were relatively excellent and suitable for heat resistance and light aging resistance standard of the vehicle interior standard.

As a result, the thermoplastic polyurethane resin composition produced in the Test Example can ensure excellent appearance quality by an injection method and largely enhance texture quality by adding polyester polyol in which particularly, characteristic constituents were mixed with an appropriate content. In addition, it was verified that excellent properties were exhibited in all items such as mechanical properties and long-term durability. On the contrary, in Comparative Examples 1 to 6, some items of injection workability, appearance quality, texture quality, abrasion resistance, mechanical properties, and long-term durability were excellent, but there was no case in which good results were exhibited in all items.

The present disclosure has been described in detail with reference to specific examples thereof. However, it will be appreciated by those skilled in the art that changes may be made in these examples without departing from the principles and spirit of the invention, the scope of which is defined in the appended claims and their equivalents.

What is claimed is:

1. A thermoplastic polyurethane resin composition comprising:
   isocyanate compound;
   a polyester polyol; and
   a chain extender,
   wherein the polyester polyol is prepared from a mixture of reactants including polytetramethylene ether glycol and polydimethylsiloxane diol,
   wherein the polyester polyol is prepared from a mixture of reactants including a multifunctional carboxylic acid compound, a multifunctional alcohol compound, polytetramethylene ether glycol and polydimethylsiloxane diol, and
   wherein the multifunctional alcohol compound is one or more selected from a group consisting of one or more diols selected from a group consisting of ethylene glycol, butane diol, and hexane diol; and trimethylol propane.

2. The thermoplastic polyurethane resin composition of claim 1, wherein the multifunctional carboxylic acid compound is one or more selected from a group consisting of adipic acid, sbelic acid, abelic acid azelic acid, sebacic acid, dodencandioc acid, and trimeric acid.

3. The thermoplastic polyurethane resin composition of claim 1, wherein the polytetramethylene ether glycol has a hydroxyl value of 56.1 to 561 mg KOH/g.

4. The thermoplastic polyurethane resin composition of claim 1, wherein the polydimethylsiloxane diol has a hydroxyl value of 100 to 150 mgKOH/g.

5. The thermoplastic polyurethane resin composition of claim 1, wherein the polyester polyol has a hydroxyl value of 11.22 to 224.11 mgKOH/g.

6. The thermoplastic polyurethane resin composition of claim 1, wherein the isocyanate compound is one or more selected from a group consisting of diphenyl methane diisocyanate (MDI), tolunene diisocyanate (TDI), dicyclohexylmethane diisocyanate ($H_{12}$MDI), and isophorone diisocyanate (IPDI).

7. The thermoplastic polyurethane resin composition of claim 1, wherein the chain extender is one or more selected from a group consisting of one or more diols selected from a group consisting of ethylene glycol, diethylene glycol, butane diol, and hexane diol; triols of trimethylol propane; and polytetramethylene ether glycol.

8. The thermoplastic polyurethane resin composition of claim 1, wherein the thermoplastic polyurethane resin composition has a melt index (MI, ISO1133 weight 2.16 kg, 200° C.) of 10 to 60 g/10 min.

9. A molded article produced by molding the thermoplastic polyurethane resin composition of claim 1.

10. The molded article of claim 9, wherein the molded article is a surface material used in the interior of a vehicle.

11. A producing method of a thermoplastic polyurethane resin composition,
    in which the thermoplastic polyurethane resin composition includes an isocyanate compound, polyester polyol, and a chain extender, the method including:
    (a) mixing a multifunctional carboxylic acid compound, a multifunctional alcohol compound, polytetramethylene ether glycol, and polydimethylsiloxane diol;
    (b) initially heating from room temperature to a primary heating temperature of 140 to 160° C. and then maintaining the temperature for 60 to 120 minutes after step (a);
    c) secondarily heating from the primary heating temperature to 210 to 230° C. and then maintaining the temperature for 10 to 120 minutes; and
    (d) producing the polyester polyol by decompressing in vacuum at the secondary heating temperature, and
    (e) mixing and polymerizing the polyester polyol produced through the steps (a) to (d), the chain extender, and the isocyanate.

12. The method of claim 11, wherein in step (d), the decompression in vacuum is performed at 650 to 760 mmHg.

* * * * *